United States Patent [19]

Hinnergardt

[11] 3,971,854

[45] July 27, 1976

[54] METHOD OF PRODUCING FREEZE-DRIED, COOKED BEEF STEAK AND RESULTING PRODUCT

[75] Inventor: Larry C. Hinnergardt, Franklin, Mass.

[73] Assignee: The United States of America as represented by the Secretary of the Army, Washington, D.C.

[22] Filed: Dec. 22, 1975

[21] Appl. No.: 643,203

[52] U.S. Cl. .............................. 426/281; 426/641; 426/385
[51] Int. Cl.² ........................................... A23L 1/31
[58] Field of Search ................... 426/281, 641, 385

[56] References Cited
UNITED STATES PATENTS

| | | | |
|---|---|---|---|
| 2,999,019 | 9/1961 | Hopkins et al. | 426/641 X |
| 3,207,608 | 9/1965 | Brown et al. | 426/652 X |
| 3,681,095 | 8/1972 | Inklaar | 426/281 |

*Primary Examiner*—Joseph M. Golian
*Attorney, Agent, or Firm*—Nathan Edelberg; Robert P. Gibson; Charles C. Rainey

[57] ABSTRACT

Method of producing freeze-dried, cooked beef steak which is tender when rehydrated and which rehydrates rapidly comprising, mechanically penetrating raw beef muscle with a plurality of cutting blades spaced apart a distance such that steaks obtained therefrom are mechanically tenderized, and pumping an aqueous solution of sodium tripolyphosphate and sodium chloride into the beef muscle prior to producing steaks therefrom, cooking the steaks, and freeze dehydrating the cooked steaks to a low moisture content.

6 Claims, No Drawings

METHOD OF PRODUCING FREEZE-DRIED, COOKED BEEF STEAK AND RESULTING PRODUCT

The invention described herein may be manufactured, used, and licensed by or for the Government for governmental purposes without the payment to me of any royalty thereon.

BACKGROUND OF THE INVENTION

This invention relates to a method of producing freeze-dried, cooked beef steak which is tender when rehydrated and which rehydrates rapidly to the extent of reabsorbing within 10 minutes at least about 95 percent of the moisture which it contained prior to being freeze-dried and of reabsorbing within 2 minutes sufficient moisture to make the steak acceptable (at least about 90 percent of the moisture which it contained prior to being freeze-dried).

The production of freeze-dried, cooked beef steak which upon being rehydrated would be acceptably tender as well as desirably flavored compared to a freshly cooked beef steak from the same muscle of a given beef animal has been a problem of long standing, particularly in the production of rations for the military. Freeze drying is a well-known procedure for preserving many types of foods both in the cooked and the raw state. However, most foods, when freeze dried, become quite board-like, brittle, and unsuitable for consumption without prior rehydration or reconstitution. Beef steak is one such food, and in addition, since it is made primarily of proteinaceous muscle fibers, it quite often is very tough when cooked, freeze dried, and thereafter rehydrated.

Various procedures have been employed to tenderize beef steak, both for immediate consumption and for preservation until some later time, as by freezing, freeze drying, or other means or methods. None of these procedures has succeeded in producing freeze-dried, cooked beef steak which upon rehydration would have good texture, especially tenderness, and which would be rehydratable within a short period of time (preferably appreciably less than ten minutes) so as to restore the steak to a highly acceptable state all-around and particularly with respect to tenderness since that is one of the most important attributes of beef steak and one which determines in great measure the value of a piece of meat. One of the more frequently employed tenderizing methods applied to meat involves mechanical rupturing of the muscle fibers, e.g. by kniving or otherwise. Another method involves treatment of the meat with proteolytic enzymes to partially degrade the protein of the meat and particularly, insofar as possible, to degrade the connective tissue since an overabundance of such tissue seems to contribute a great deal to making meat tough. Yet another procedure that has been previously found to aid in reducing the degree of toughness of various meats, fish, or other largely muscular foods involves soaking the meat in a solution of a phosphate or injecting the meat with, i.e. pumping into the meat, a solution, preferably aqueous, of a phosphate, such as sodium tripolyphosphate, sodium pyrophosphate, one of the several sodium orthophosphates, or some other phosphate, usually in the form of a sodium salt or mixture of sodium salts, and sometimes in combination with sodium chloride. None of these procedures used alone with cooked beef steak results in a freeze dried steak which rehydrates very rapidly and substantially completely within less than ten minutes, and preferably within about two minutes, and which is acceptable in tenderness as well as in other organoleptic characteristics immediately following such short-term rehydration or reconstitution as does the process of the present invention.

Mechanical tenderization of meat is disclosed in United States Pat. Nos. 3,256,801; 3,535,734; 3,583,025; and 3,842,464. Chemical solution tenderization of meat or fish of various types is disclosed in U.S. Pat. Nos. 2,140,781; 2,999,019; 3,207,608; 3,620,767; and 3,875,313. There are also United States patents relating to the curing of meats using aqueous solutions of various salts as curing agents, particularly for pork, some of which disclose the incorporation of a phosphate salt or mixture of such salts or mixtures thereof with sodium chloride or other non-phosphate salts. Representative of such patents are U.S. Pat. Nos. 2,903,366 and 3,028,246. Phosphate solutions have also been disclosed for use in preventing or reducing fluid exudation from small cuts of meat, as in U.S. Pat. No. 3,049,428.

An object of the present invention is to provide a freeze-dried, cooked beef steak which, when treated with water to rehydrate it, regains sufficient moisture within a short period of time, such as no more than ten minutes, to make it acceptable, and which is very tender in the rehydrated state while retaining good all-around organoleptic qualities and to provide a method of producing such a freeze-dried, cooked beef steak product.

Other objects and advantages will become apparent from the following description of the invention.

SUMMARY OF THE INVENTION

A freeze-dried, cooked beef steak product which, when rehydrated is tender and juicy, and which rehydrates rapidly, and a method of producing such a product comprising, mechanically tenderizing the beef muscle from which the beef steak is to be obtained, using a plurality of cutting blades for penetrating the beef muscle, thereafter pumping into the mechanically tenderized beef muscle an aqueous solution of sodium tripolyphosphate and sodium chloride in effective amounts to further tenderize the beef muscle, then cutting the thus treated beef muscle into steaks, cooking the steaks, and freeze-drying the resulting beef steaks to less than 2 percent moisture content.

DESCRIPTION OF THE PREFERRED EMBODIMENT

The process of the invention involves a combination of mechanical tenderization of beef muscle by penetration thereof with knife blade-like penetrators with injection or pumping of the mechanically tenderized beef muscle with an aqueous solution comprising a water soluble phosphate, preferably in the form of a sodium salt, and sodium chloride, both the phosphate and the sodium chloride being present in the aqueous solution in relatively low concentrations. Following injection or pumping of the beef muscle with the aqueous solution of phosphate and sodium chloride, the beef muscle is sliced into suitable thickness for cooking as steaks; the steaks are then cooked, preferably by grilling at a suitable temperature, such as about 176°C., for a suitable length of time, such as for about 3 minutes on each side. The cooked steaks are then frozen, for example to about −23°C., and thereafter freeze-vacuum-dehydrated. The freeze-dried, cooked steaks may then be hermetically sealed, preferably employing a nitrogen flush prior to sealing the freeze-dried, cooked steaks in metal cans under vacuum. Other methods and means may be employed for protecting the freeze-dried, cooked steaks against atmospheric moisture and oxygen until a suitable time arrives for consumption of the steaks, whereupon they are removed from the cans or other containers and rehydrated by submersion in water, preferably in the warm range, for example at about 50°–60°C., for a time sufficient to accomplish at least 90% rehydration, and preferably 95% rehydration or higher. Rehydration to 90% of the original moisture content within 2 minutes is considered highly desirable for beef steaks includes in military rations, but rehydration for 10 minutes will generally result in almost completely rehydrated steaks (95% or higher) processed in accordance with this invention.

The mechanical tenderization of the beef muscle is preferably carried out by passing the muscle three times through a Bettcher Industries "TendR-Rite", Model TR-2 tenderizer at the slowest throughput speed for this multiple knife blade type tenderizer. This type of mechanical tenderizer comprises multiple parallel rows of cutting blades which are about one-eighth inch wide and one-thirty-second inch thick at the ends which completely penetrate the meat to be tenderized. The blades are staggered in successive rows so that the penetrations in the meat are about one-fourth inch apart on centers in the majority of cases, though at the outer edges of the penetration pattern they may be about one-half inch apart. Mechanical tenderization as used herein refers to the application of a plurality of knife cuts at least one-sixteenth inch up to about one-fourth inch in width substantially perpendicularly to the axes of the muscle fibers with said cuts being spaced apart a distance of from about one-half to about one-eighth inch on centers, said cuts being produced by knife blades travelling in substantially straight lines which are substantially perpendicular to the axes of the muscle fibers.

For the purposes of the specification and claims, all percentage values are percentages by weight. Percent M uptake is percent moisture uptake which is represented by the equation:

$$\text{Percent } M \text{ Uptake} = \frac{\text{wet weight} - \text{dry weight}}{\text{wet weight}} \quad (1)$$

and percent rehydration is percent moisture rehydrated, which is represented by the equation:

$$\text{Percent Rehydration} = \frac{\% M \text{ Uptake}}{\% M \text{ Original}} \quad (2)$$

wherein % M Original is the percent moisture in the beef steak prior to freeze dehydration thereof.

The following example describes the method by which freeze-dried, cooked beef steak which is tender when rehydrated and which rehydrates rapidly is produced.

EXAMPLE 1

U.S.D.A. Choice top rounds of beef, 7 to 10 days postmortem, were individually wrapped in freezer paper and stored at −23°C. for 7 days. The rounds were randomly divided into four lots and by random selection equilibrated to a temperature of 4.4°C. The semimembranosus muscle was excised from each round. The muscles from each of the four lots were treated differently, as described below, in order to provide data for a statistical analysis of the effects of the four treatments on tenderness, rate of rehydration, and other characteristics of rehydrated freeze-dried, cooked beef steaks obtained from the several lots of beef rounds.

Each semimembranosus muscle from Lot No. 1 was mechanically tenderized by passing the muscle three times through a Bettcher Industries "Tend-R-Rite" Model TR-2 tenderizer at the slowest throughput speed at which the tenderizer operates. Then an aqueous solution containing 3.0% sodium tripolyphosphate (TPP) and 7.5% sodium chloride was pumped into the muscles to 10% of their weight, thus introducing into each muscle about 0.3% sodium tripolyphosphate and about 0.75% Na Cl. This was accomplished using a Koch Tenderizer Injector (8127) equipped with four stainless steel needles spaced about 2.2 cm apart. A constant pump gauge pressure of 13.6 kg was maintained during pumping.

Each muscle from Lot No. 2 was only mechanically tenderized by passing the muscle through the Bettcher Industries Tend-R-Rite Model TR-2 tenderizer in the same manner as was done in the case of Lot No. 1 muscles.

Each muscle from Lot No. 3 was only treated with the same aqueous solution of TPP and Na Cl as in the case of Lot No. 1 muscles.

Each muscle from Lot No. 4 was given no mechanical tenderization treatment and no aqueous solution of TPP and Na Cl treatment, thus being a control lot.

The muscles were frozen at −23°C. immediately following completion of the treatment or treatments described above, the control lot being maintained frozen until all of the muscles were ready to be cut into steaks. The muscles were then sliced, five slices 1.27 cm thick being obtained from the center portion of each muscle by cutting across the grain with a meat saw. Individual steaks were cut from the slices using a 6.35 cm diameter die. Each steak was grilled at a temperature of 176°C. for 3 minutes on each side. The grilled steaks were frozen to −23°C., then freeze-vacuumdehydrated in a Stokes freeze dehydrator at a plate temperature of about 51.6°C. and a chamber pressure of 0.3–0.5 mm Hg to a moisture content of less than 2.0 percent. All of the freeze-dried steaks were hermetically sealed under a vacuum of at least about 27 inches of mercury in No. 2½ metal cans after a nitrogen flushing of the cans containing the steaks, thus reducing the oxygen content to 2.0 percent or less, as determined in accordance with the method of Bishov, S. J. and Henick, A. S., *Journal of the American Oil Chemists' Society*, Vol. 43, page 477 (1966). The packaged freeze-dried, cooked beef steaks were stored for one month at room temperature prior to rehydration and testing thereof.

After storage, the steaks were rehydrated by submerging them in water at about 48.9°C. for 10 minutes. Percent moisture uptake was determined for each steak sample in accordance with equation (1) above. Penetrometer measurements of tenderness were accomplished in accordance with the method and with the apparatus of Hinnergardt and Tuomy, *J. Food Science* 35, 312 using an Allo-Kramer shear press modified with a five-needle penetrometer head. Penetrometer values represented shear force in pounds of force required to penetrate a 1.27 cm thick beef steak.

chloride absorbed when so treated, are included in Table 1.

TABLE 1

| Characteristic Of Meat Samples | Lot No. 1 (Mech. + TPP/Na Cl) | Lot No. 2 (Mech. Only) | Lot No. 3 (TPP/Na Cl Only) | Lot No. 4 (Neither Treatment) |
|---|---|---|---|---|
| Shear Force (lbs.) (Penetrometer) | 5.15 ± 0.95 | 6.36 ± 1.20 | 9.02 ± 2.06 | 10.86 ± 2.06 |
| Tenderness | 5.95 | 5.05 | 4.22 | 2.87 |
| Cutability | 6.55 | 5.97 | 4.55 | 2.67 |
| Juiciness | 4.40 | 3.97 | 4.80 | 3.20 |
| Residue | 3.87 | 4.22 | 4.60 | 5.57 |
| Percent Moisture Uptake | 55.96 ± 3.46 | 53.61 ± 3.68 | 56.61 ± 5.07 | 50.00 ± 5.36 |
| Chemical Analyses: | | | | |
| $H_2O$ (%) | 73.45 | 71.69 | 73.56 | 70.77 |
| Fat (%) | 4.72 | 3.98 | 2.28 | 5.44 |
| NaCl (%) | 1.14 | 0.23 | 0.84 | 0.19 |
| P (mg/100 g) | 275 | 217 | 248 | 210 |
| Ash (%) | 2.28 | 1.11 | 2.06 | 1.06 |
| pH | 5.7 | 5.3 | 5.5 | 5.4 |
| Protein (%) | 19.62 | 23.46 | 20.74 | 21.97 |

Immediately following the penetrometer measurements each steak was evaluated subjectively by a panel of twenty food technologists and food chemists selected on the basis of previous experience in the sensory assessment of food texture, including meats. Two replications of the subjective test were conducted, one in the morning and the other in the afternoon of the same day. Samples were presented to the members of the panel in a balanced random order. The panel members were provided with definitions of four subjective attributes to be employed in evaluating the steak samples. A nine-category bipolar type scale was used to estimate the magnitude of each subjective attribute. The four subjective attributes evaluated were (1) tenderness, (2) cutability, (3) juiciness, and (4) residue. Tenderness is defined as the overall effort required to chew a sample on the first and subsequent chews (1 = extremely tough; 9 = extremely tender). Cutability is defined as the degree of difficulty or ease one experiences in biting through a sample on one or more tries when the sample is initially put in the mouth (1 = extremely difficult to bite through; 9 = extremely easy to bite through). Juiciness is defined as the degree to which one can feel free liquid in the mouth (1 = extremely dry; 9 = extremely juicy). Residue is defined as the amount of material remaining in the mouth just before swallowing the sample (1 = none; 9 = greatest amount).

Mean results of the above-described objective (penetrometer) and subjective (technological panel) tests are given in Table 1. The mean percent moisture uptake is also given in Table 1 for each lot of samples. In addition, chemical analyses of the trim from the raw steaks of each lot, including the phosphate and sodium It is apparent from the results in Table 1 that the combined use of mechanical tenderization and pumping into the beef muscle a mixture of TPP and Na Cl resulted in a greatly tenderization of the beef muscle as evidenced by the results obtained on the rehydrated cooked steaks prepared from the beef muscle. Cutability also was greatly enhanced. Also the penetrometer (objective) shear force values were greatly reduced by the combination treatment is comparison with the mechanical treatment only or the TPP + Na Cl treatment only.

EXAMPLE 2

Freeze-dried, cooked beef steaks were prepared, packaged and stored similarly to the freeze-dried, cooked steaks described in Example 1. These steaks were evaluated with respect to their rates of rehydration in water at 60°C. by submerging steak samples in water at about 60°C. for time periods in increments of 2 minutes from 2 to 10 minutes. Percent moisture uptake was determined for each steak sample as in Example 1 and equation (1) given above. Also the precent rehydration was calculated in accordance with equation (2) above. Table 2 gives the results, each value representing the average of ten samples similarly treated and evaluated.

TABLE 2

| | Percent Moisture Uptake Rehydration Time (Minutes) | | | | | Percent Rehydration Rehydration Time (Minutes) | | | | |
|---|---|---|---|---|---|---|---|---|---|---|
| | 2 | 4 | 6 | 8 | 10 | 2 | 4 | 6 | 8 | 10 |
| Lot No. 1 (Mech. + TPP/NaCl) | 55 | 56 | 57 | 57 | 58 | 90 | 92 | 94 | 94 | 96 |
| Lot No. 2 (Mech. Only) | 53 | 54 | 56 | 56 | 56 | 86 | 88 | 92 | 92 | 92 |
| Lot No. 3 (TPP/NaCl Only) | 48 | 50 | 53 | 53 | 53 | 76 | 80 | 86 | 86 | 86 |
| Lot No. 4 (Neither Treatment) | 48 | 50 | 51 | 52 | 52 | 76 | 80 | 82 | 84 | 84 |

As a result of many studies of rehydration of freeze-dried, cooked beef steak, it has been found that to be acceptable the rehydrated steak must have a percent rehydration of at least 90 percent. This corresponds in general to a percent moisture uptake of at least 55 percent.

It is apparent from the above results in Table 2 that only the samples of Lot No. 1 (mechanically tenderized plus treatment with TPP and NaCl) attained an acceptable level after 2 minutes rehydration. It is also apparent that at each rehydration time interval the Lot No. 1 samples of steak were higher above the acceptable level than were the samples for any of the other lots of beef steak samples. This, therefore, shows that freeze-dried, cooked beef steak prepared in accordance with the process of the present invention rehydrates appreciably more rapidly than similar steak either mechanically tenderized only or treated with TPP and NaCl only or not treated or mechanically tenderized at all. There appears, therefore, to be an unexpected effect due to the combination of mechanical tenderization and chemical treatment involving pumping TPP and NaCl into the beef muscle prior to cooking and freeze drying of beef steak.

Although the invention has been described in terms of the use of a particular type and model of mechanical tenderizer and a particular solution of sodium tripolyphosphate and sodium chloride, it is to be understood that other types of mechanical tenderizers and other types of cutting means, and cutting means having other dimensions, may be employed in combination with aqueous solutions of other concentrations of sodium tripolyphosphate and sodium chloride, or even other phosphates in combination with sodium chloride. Sodium tripolyphosphate in concentrations of from about 3.0 percent to about 5.0 percent in aqueous solutions in combination with sodium chloride in concentrations of from about 5.0 percent to about 10.0 percent has been found to be quite effective in combination with mechanical tenderization for producing very tender, juicy, and rapidly rehydratable freeze-dried, cooked beef steaks. The amount of the aqueous solution of sodium tripolyphosphate and sodium chloride pumped into the mechanically tenderized muscle may range from about 8 to about 12 percent. Use of such solutions of sodium tripolyphosphate and sodium chloride results in the absorption of from about 0.3 to about 0.5 percent of sodium tripolyphosphate and from about 0.5 to about 1.0 percent sodium chloride by the beef muscle when the muscle is pumped with about 10 percent of the aqueous solution. Higher amounts of sodium tripolyphosphate and sodium chloride may be pumped into the beef muscle, if desired; but it has been found in most cases to be unnecessary to do so since the above-described amounts of sodium tripolyphosphate and sodium chloride added to the beef muscle after it has been mechanically tenderized as described above have been found to be adequate for the preparation of quite tender and rapidly rehydratable and highly acceptable freeze-dried, cooked beef steaks.

The method of the invention has the distinct advantage of providing a method for producing freeze-dried, cooked beef steaks which rehydrate so rapidly that within 2 minutes after rehydration is initiated in water at about 60°C. the steaks are immediately acceptable for eating and that the rehydrated steaks are very tender and juicy as well as tasty. The invention also provides a method for converting lower quality beef muscle, such as commercial grade beef muscle, into quite acceptable and rapidly rehydratable freeze-dried, cooked beef steaks.

I wish it to be understood that I so not desire to be limited to the exact details described, for obvious modifications will occur to a person skilled in the art.

I claim:

1. Method of producing freeze-dried, cooked beef steaks which are rapidly rehydratable and which are tender and juicy following rehydration which comprises, mechanically tenderizing beef muscle by penetrating the beef muscle from which said beef steaks are to be prepared by inserting sharp, narrow cutting means into and through said beef muscle at least one time, withdrawing said cutting means from said beef muscle, pumping into said beef muscle at a plurality of substantially equally spaced apart points an aqueous solution containing from about 3.0 to about 5.0 percent sodium tripolyphosphate and from about 5.0 to about 10.0 percent sodium chloride until said beef muscle has absorbed from about 8 percent to about 12 percent of said aqueous solution, freezing said beef muscle containing said aqueous solution, cutting said beef muscle into slices suitable for cooking as steaks, cooking said slices to produce cooked beef steaks, freezing said cooked beef steaks, and freeze-vacuum-dehydrating said cooked beef steaks to a moisture content less than about 2.0 percent.

2. Method according to claim 1, wherein said cutting means comprise multiple parallel rows of cutting blades, said cutting blades being about one-eighth inch wide and one-thirty-second inch thick at the ends thereof which penetrate said beef muscle.

3. Method according to claim 2, wherein said cutting blades are spaced apart from about one-eighth to about one-half inch on centers.

4. Method according to claim 1, wherein from about 0.3 to about 0.5 percent sodium tripolyphosphate and from about 0.5 to about 1.0 percent sodium chloride are pumped into said mechanically tenderized beef muscle.

5. Method according to claim 1, wherein said freeze-dried, cooked beef steaks are vacuum packaged and hermetically sealed in substantially moisture- and air-impermeable containers wherein the oxygen content is 2.0 percent or less.

6. Freeze-dried, cooked beef steak produced by the process of claim 1 and characterized by being rehydratable to form an acceptable ready-to-eat beef steak in water at about 60°C. within about 2 minutes, said beef steak having a plurality of short cuts of at least one-sixteenth inch up to about one-fourth inch in length passing therethrough and spaced apart by from about one-eighth to about one-half inch on centers and having absorbed therein from about 0.3 to about 0.5 percent sodium tripolyphosphate and from about 0.5 to about 1.0 percent sodium chloride based on the hydrated form of the beef steak.

* * * * *